United States Patent
Sorkin

[11] 3,885,860
[45] May 27, 1975

[54] FABRICATION OF LIQUID CRYSTAL DEVICES

[75] Inventor: Howard Sorkin, Berkeley Heights, N.J.

[73] Assignee: RCA Corporation, New York, N.Y.

[22] Filed: Sept. 27, 1973

[21] Appl. No.: 401,233

[52] U.S. Cl. ............. 350/160 LC; 29/576; 29/588; 29/592
[51] Int. Cl. ......................... G02f 1/28; G02f 1/36
[58] Field of Search ........ 350/160 LC; 29/576, 588, 29/592

[56] References Cited
UNITED STATES PATENTS 3,701,368  10/1972  Stern .......................... 350/160 LC
3,787,110  1/1974  Berreman ..................... 350/160 LC

*Primary Examiner*—W. Tupman
*Attorney, Agent, or Firm*—H. Christoffersen; M. Y. Epstein

[57] ABSTRACT

In liquid crystal devices employing twisted nematic materials, surfaces of the device enclosure are provided with oriented microstructures along which the molecules of the liquid crystal material are aligned. The microstructures are provided by techniques allowing heating thereof to elevated temperatures without loss of the molecular aligning characteristic, and a liquid crystal material is hermetically encapsulated within the device enclosure by means of a fused joint provided at an elevated temperature.

5 Claims, 1 Drawing Figure

PATENTED MAY 27 1975          3,885,860
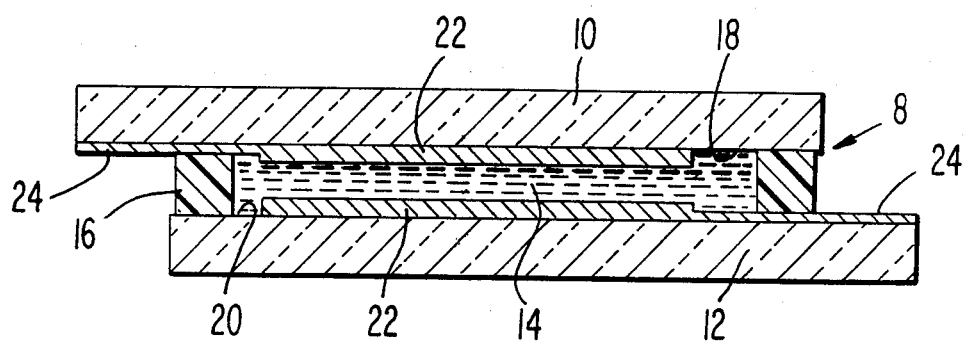

FABRICATION OF LIQUID CRYSTAL DEVICES

This invention relates to liquid crystal devices, and particularly to the fabrication of hermetically sealed liquid crystal devices.

One type of recently developed liquid crystal device, see U.S. Pat. No. 3,731,986, issued May 8, 1973 to Fergason (the disclosure thereof being incorporated herein), employs what is known as a "twisted" nematic liquid crystal material. Such devices comprise two closely spaced apart substrates sandwiching a thin film of liquid crystal material therebetween. The inner surfaces of the substrates are so treated and oriented with respect to one another that while adjacent molecules of the liquid crystal material are generally aligned with one another, the direction of the axis of alignment of the molecules gradually rotates or "twists" through some angle, e.g., 90°, from one substrate to the other. This angular rotation or "twist" of the axis of alignment of the molecules causes a corresponding angular rotation of the plane of polarization of linearly polarized light directed through the liquid crystal film. Moreover, by selectively applying an electric field through different portions of the film, these portions are "untwisted", with the result that the polarized light passing therethrough is not rotated. Removal of the electric field allows the liquid crystal material to return to its twisted state.

To obtain the desired twisted alignment of the liquid crystal molecules, it is necessary to "influence" or direct the alignment of the molecules at each substrate. This is done by treating the inside surfaces of the substrates to provide thereon some sort of "grained" microstructure having a definite axis of orientation along which the liquid crystal molecules align themselves. By arranging the microstructure orientation of the two substrates at a preselected angle with respect to one another, the proper twist through the liquid crystal film is obtained.

One problem in the fabrication of such twisted liquid crystal devices, however, is that it appears that the known surface treatments are temperature sensitive. Thus, for example, in experiments in which the desired surface microstructure orientations are obtained by "rubbing" the substrate surfaces, in accordance with the showing of the aforementioned patent, the twisted alignment of the liquid crystal molecules is not obtained when the rubbed substrates are exposed to relatively high temperatures, in the order of 300°C. This inability of the substrates to induce the twisted condition when the substrates are exposed to elevated temperatures is a severe problem with respect to providing devices in which the liquid crystal material is hermetically sealed within the device enclosure. At present, the only practical way to hermetically seal the usual type liquid crystal material enclosures is the use of a relatively high temperature fusing process, e.g., the use of a glass frit.

The drawing shows a liquid crystal device, in cross-section, fabricated in accordance with this invention.

With reference to the drawing, a liquid crystal device 8 is shown comprising a pair of substrates 10 and 12, a film 14 of a liquid crystal material therebetween, and a bead 16 of fused glass hermetically sealing the liquid crystal material between the two substrates. The spacing between the substrates 10 and 12 is in the order of ½ mil (about 13 micrometers), the spacing being controlled either by the use of spacer members (not shown) between the substrates or by the glass bead 16 itself. Each of the inside surfaces 18 and 20 of the two substrates 10 and 12, respectively, is provided with an electrode 22 comprising a thin coating of a conductive material, e.g., tin oxide, an extension 24 thereof extending along the substrate surface to outside the bead 16 where electrical connection means, not shown, can be made thereto. Generally, while not shown herein, one or both of the electrodes 22 is patterned, i.e., partially removed to expose the underlying substrate surface, in the form of some image to be displayed.

The device 8 utilizes the twisted mode of liquid crystal material operation. To this end, each inside surface 18 and 20 of the two substrates 10 and 12 is treated to provide thereon an oriented microstructure which can align molecules of the liquid crystal. By "oriented microstructure" is meant to include microscopic grooves, scratches, ridges, peaks and valleys, and the like, which are parallel to one another and which are capable of causing sympathetic alignment of the liquid crystal molecules.

One means to provide such an oriented microstructure on the substrate surfaces is the use of a process described in an article by John L. Janning, entitled "Thin Film Surface Orientation For Liquid Crystals," Applied Physics Letters, Vol. 21, No. 4, Aug. 15, 1972, at p. 173, the disclosure of said article being incorporated herein. In this process, as described in the article, certain inorganic materials such as gold, and preferably silicon monoxide, are vacuum deposited, to a thickness of 100 A or less, onto the substrates using a vapor deposition angle of approximately 5° to the plane of the surfaces to be coated. That is, using a point source of the material to be deposited, the surfaces of the substrates to be coated are disposed practically parallel to the direction of travel of the coating particles, i.e., a small vapor deposition angle is used. While not described in the article, recent experiments have shown that somewhat thicker deposited material layers (e.g., at least up to 700A) and larger deposition angles (e.g., at least up to 45°) can be used with satisfactory results.

While not known for sure, it is believed that the coating process results in a large number of tiny, parallel ridges being formed on the substrate surfaces. These parallel ridges provide the oriented microstructure along which the liquid crystal molecules align themselves. By deposited "layer" is meant the deposited material, whether it is continuous from ridge to ridge or not.

By disposing the two substrates 10 and 12 within the device with the microstructure direction of orientation of each substrate at some angle with respect to one another, the necessary condition for achieving twisted alignment of the liquid crystal molecules is provided.

Another method of providing a suitable oriented microstructure on the substrates comprises rubbing the surfaces with an abrasive material to scour or gouge generally parallel, microscopic scratches or valleys in the surfaces. The scratched microstructure is not subject to physical change upon heating the substrates to a temperature less than the softening temperature of the substrates. Such heating of the substrates, to the softening temperatures thereof, is preferrably avoided.

The fabrication of the device 8 is as follows. Starting with the two substrates 10 and 12 each having an electrode 22 and an electrode extension 24 thereon, provided by known means, a bead of glass frit is deposited along the edges of one of the substrates, as by silk screening. Then, using one of the aforedescribed processes, the substrates are treated to provide the oriented microstructures thereon. The two substrates are then properly oriented with respect to one another, both with respect to alignment of the two electrodes 22 and angular displacement of the oriented microstructures on the two substrates with respect to one another. Also, the two substrates are contacted with one another along the glass frit bead and, while applying compressive pressure to hold the substrates together, the assembly is heated to a temperature, dependent upon the glass frit used and generally in the range of 380°C to 540°C, to soften the bead and fusion seal the substrates together. This temperature range is less than the softening temperature of the substrates. The fused joint hermetically seals together the two substrates, a space, however, being provided therebetween to receive the liquid crystal material.

Thereafter, using a process such as that described in U.S. Pat. No. 3,701,368, issued to H. Stern on Oct. 31, 1972, the liquid crystal material is introduced into the space between the substrates, and the filling ports hermetically sealed off. By virtue of the angular displacement of the microstructures on the inside surfaces of the two substrates, a corresponding angular rotation of the axis of alignment of the molecules of the liquid crystal material, i.e., the "twist effect," is automatically obtained. In the usual case, the substrate microstructures are oriented at an angle of 90° with respect to one another, a twist of 90° thus being produced through the liquid crystal material.

Of significance is that such twist effect is obtained in spite of the relatively high temperature processing of the substrates after the oriented microstructures are provided thereon. That is, as previously mentioned, in experiments in which the substrate microstructure was provided by rubbing, as described in the aforecited patent to Fergason, a subsequent high temperature processing of the substrates for hermetically sealing them together resulted in an inability to obtain the twisted condition when the liquid crystal material was introduced into the device. Also, using the process described in the aforecited article by Janning (in which no subsequent high temperature processing is described), and depositing silicon monoxide on the substrate surfaces, it is to be expected, and is believed to be the case, that the deposited layer of silicon monoxide is chemically affected by the subsequent elevated temperature sealing process (in the presence of oxygen) in that the silicon monoxide is converted to silicon dioxide. This, it is found, however, does not interfere with obtaining the twisted effect.

As known, the twist effect can be induced in any number of liquid crystal materials possessing positive dielectric anisotropy, descriptions and examples of such materials being provided in the aforecited patent to Fergason and in an article by Schadt and Helfrich, page 127 of Applied Physics Letters, Vol. 18 Feb. 15, 1971.

Of major importance herein is that devices can thus be provided in which the liquid crystal material is hermetically sealed within the device enclosure. By so hermetically encapsulating the liquid crystal material, and thus protecting it from contaminating materials, especially water vapor, devices can be provided which have stable operating characteristics over unusually long periods of time.

I claim:

1. A method of fabricating a liquid crystal device comprising:
   providing on each of two spaced apart surfaces of a device enclosure an electrode,
   vapor depositing, using a small vapor deposition angle, an inorganic material on at least one of said electrodes to provide on said one electrode a surface along which the molecules of a liquid crystal material sympathetically align, the aligning characteristic of said electrode surface not being disrupted when said electrode surface is exposed to a first temperature,
   hermetically sealing together portions of said enclosure with a fused joint formed at said first temperature, said electrode surface being heated to said temperature in the process, and
   introducing a liquid crystal material into said enclosure and into contact with said electrode surface.

2. The method of claim 1 in which said sealing step includes the step of disposing a bead of glass frit along portions of one of two enclosure members each of which includes a different one of said two surfaces, contacting said two members along said bead, and fusion sealing together said two members with said bead.

3. The method of claim 2 wherein a layer of silicon monoxide is deposited in said vapor depositing step, and said layer is heated in the presence of oxygen to convert it to silicon dioxide.

4. A liquid crystal device made by the process of claim 3.

5. A liquid crystal device made by the process of claim 1.

* * * * *